(12) United States Patent
Danzy et al.

(10) Patent No.: US 12,498,056 B2
(45) Date of Patent: Dec. 16, 2025

(54) VACUUM RELIEF VALVE FOR RAILROAD TANK CAR

(71) Applicant: McKenzie Valve & Machining LLC, McKenzie, TN (US)

(72) Inventors: Roger Dale Danzy, Chatham, LA (US); Rusty Klasen, Houston, TX (US); Tommy Summers, McKenzie, TN (US)

(73) Assignee: Valve & Machining LLC, McKenzie, TN (US)

( * ) Notice: Subject to any disclaimer, the term of this patent is extended or adjusted under 35 U.S.C. 154(b) by 295 days.

(21) Appl. No.: 18/457,647

(22) Filed: Aug. 29, 2023

(65) Prior Publication Data

US 2024/0068594 A1    Feb. 29, 2024

Related U.S. Application Data

(60) Provisional application No. 63/401,917, filed on Aug. 29, 2022.

(51) Int. Cl.
| | |
|---|---|
| *F16K 37/00* | (2006.01) |
| *B65D 90/00* | (2006.01) |
| *F16K 17/04* | (2006.01) |
| *G01M 3/02* | (2006.01) |
| *G01M 3/06* | (2006.01) |
| *G01M 3/22* | (2006.01) |

(52) U.S. Cl.
CPC ............ *F16K 37/0091* (2013.01); *B61D 5/08* (2013.01); *F16K 17/04* (2013.01); *G01M 3/02* (2013.01); *G01M 3/06* (2013.01); *G01M 3/224* (2013.01)

(58) Field of Classification Search
CPC ........ G01M 3/086; G01M 3/10; G01M 3/144; G01M 3/146; G01M 3/06; G01M 3/02; G01M 3/224; F16K 17/04; F16K 24/06; F16K 37/0091; B61D 5/08
See application file for complete search history.

(56) References Cited

U.S. PATENT DOCUMENTS 8,347,911 B2 *   1/2013   Stocker, Jr. ............ F16K 15/063
                                                           137/526

FOREIGN PATENT DOCUMENTS

WO      WO-03095965 A2 *   11/2003   ......... F16K 37/0091

* cited by examiner

*Primary Examiner* — Kristina M Deherrera
*Assistant Examiner* — Jean F Morello
(74) *Attorney, Agent, or Firm* — Arnold & Porter Kaye Scholer LLP (57) ABSTRACT

A vacuum relief valve for a railroad tank car and methods for using the same to test the vacuum relief valve for leaks without requiring removal of the valve from the railroad tank car are described herein. According to one aspect of the invention, a vacuum relief valve described herein may be inspected for leaks without removing the vacuum relief valve from the railroad tank car by using two or more access openings located on the body of the vacuum relief valve. According to another aspect of the invention, a vacuum relief valve described herein may be inspected for leaks without removing the vacuum relief valve from the railroad tank car by using an opening to an interior cavity of the valve body that is revealed by rotating a cover from a closed position to an open position.

15 Claims, 12 Drawing Sheets

VACUUM RELIEF VALVE FOR RAILROAD TANK CAR

RELATED APPLICATIONS

This application claims priority to U.S. Provisional Patent Application No. 63/401,917 filed Aug. 29, 2022, the content of which is incorporated herein by reference in its entirety.

FIELD OF THE INVENTION

The present invention relates to a vacuum relief valve and a method of inspecting the same for leaks without removing the vacuum relief valve from the railroad tank car.

BACKGROUND OF THE INVENTION

Railroad tank cars are frequently used to transport a variety of liquid or gaseous commodities, such as crude oil, acid, fertilizer, polymer, food grain products, and/or other goods or resources. Vacuum relief valves are frequently used on tank cars to automatically allow air into the tank car to prevent vacuum conditions that could damage the tank car. For example, a vacuum may be formed in a tank car due to changes in pressure and/or temperature. Such a vacuum can exert extreme stress on the tank car and, in some cases, even cause the tank car to implode on itself. Vacuum relief valves are used to prevent the buildup of excessive pressure or vacuum that may result in damage to the tank car. For example, when a vacuum forms within a tank car, the vacuum (i.e., the pressure difference) exerts a force on a valve stem of the relief valve that causes the valve stem to move and the valve to open. Air from outside the tank car may then be allowed to enter the tank through the valve in order to relieve the vacuum or otherwise equalize the pressure difference between the inside of the tank and the outside of the tank.

However, the air allowed to enter the tank through the vacuum relief valve may contain debris from the environment particularly from blasting operations to remove paint and rust during the repair of a tank car. This debris can become trapped between the seating components of the vacuum relief valve and may cause leaks from the tank car when there is positive pressure in the tank car. Such leaks must be inspected and repaired before the tank car continues its route.

To ensure vacuum relief valves are in proper working order, the valves must be regularly inspected to ensure there are not any leaks. Conventional methods for inspecting a relief valve on a railroad tank car requires removing the valve from a protective housing, disassembling the valve, and/or otherwise removing the valve from the tank car. These methods are typically expensive and result in a substantial loss of operation time due to the time required to inspect and service the valve. A vacuum relief valve and corresponding inspection method that enable the valve to be inspected for leaks without requiring the valve to be removed from the tank car would be a significant improvement over conventional vacuum relief valves for railroad tank cars.

SUMMARY OF THE INVENTION

Aspects of this disclosure relate to a vacuum relief valve for a railroad tank car and a method of using the same to reduce the risk of potential leaks due to debris that may enter into the vacuum relief valve and to test the vacuum relief valve for leaks without requiring removing the vacuum relief valve from the railroad tank car. In various embodiments, the vacuum relief valve may comprise a valve body comprising a flanged portion and two or more access openings, wherein a base of the flanged portion is in contact with a top or a side of a railroad tank car when the vacuum relief valve is installed on the railroad tank car. In some embodiments, the two or more access openings may be integral to the valve body. In some embodiments, the two or more access openings may be located proximate to a beginning of the flanged portion on the valve body.

In some embodiments, the two or more access openings may extend radially and outwardly from an interior cavity of the vacuum relief valve. In an example embodiment, the two or more access openings may include four access openings equally spaced apart from one another circumferentially on an outer surface of the body of the vacuum relief valve. In various embodiments, the two or more access openings are configured to receive leak detection fluid to enable detection of a leak without removing the vacuum relief valve from the railroad tank car.

In various embodiments, a vacuum relief valve described herein may be inspected for a leaks without removing the vacuum relief valve from the railroad tank car. For example, in various embodiments, leak detection fluid may be injected into an interior cavity of a body of the vacuum relief valve. If no bubbles form at or within an opening of the body of the vacuum relief valve, a determination may be made that there is no leak at the vacuum relief valve. If bubbles do form at or within an opening of the body of the vacuum relief valve, a determination may be made that there is a leak at the vacuum relief valve. In various embodiments, the leak detection fluid may be injected into the interior cavity of the valve body by sealing all but one of two or more access openings located on the body of the vacuum relief valve and injecting the leak detection fluid into the interior cavity of the body of the vacuum relief valve via the one unsealed access openings located on the body of the vacuum relief valve. If it is determined that there is a leak at the vacuum relief valve, the vacuum relief valve may then be removed for repair.

In some embodiments (e.g., when there are not access openings located on an outer surface of the valve body), the leak detection fluid may be injected into the interior cavity of the valve body by sliding a cover selectively attached to a top surface of the vacuum relief valve to an open position to reveal an opening to the interior cavity of the vacuum relief valve, and injecting the leak detection fluid into the interior cavity of the body of the vacuum relief valve via the opening to the interior cavity of vacuum relief valve revealed by sliding the cover to the open position. For example, the cover may be selectively attached to the body of the vacuum relief valve via two or more cover mounting fasteners, and the cover may be configured to slidably rotate about one of the two or more cover mounting fasteners when all but the one of the two or more cover mounting fasteners are removed. If it is determined that there is not a leak at the vacuum relief valve, the cover may be slid to a closed position to block access to the interior cavity of the vacuum relief valve. In some embodiments, the cover may be secured to the body of the vacuum relief valve using a safety cable extending between at least two of the two or more cover mounting fasteners.

In some embodiments, the vacuum relief valve may include a screen assembly comprising an air-filter screen configured to prevent debris from reaching the vacuum relief valve, and a screen cover configured to protect the air-filter screen. In some embodiments, the screen cover may include one or more screen access openings. In some embodiments, the screen cover may include a mesh selected to limit a size of debris particles that can enter into the vacuum relief valve. In some embodiments, the screen cover may be configured to form a debris tight seal when in contact with the body of the vacuum relief valve.

These and other objects, features, and characteristics of the invention disclosed herein will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The present invention is illustrated by way of example and not limited in the accompanying figures in which like reference numerals indicate similar elements and in which.

These drawings are provided for purposes of illustration only and merely depict typical or example embodiments. These drawings are provided to facilitate the reader's understanding and shall not be considered limiting of the breadth, scope, or applicability of the disclosure. For clarity and ease of illustration, these drawings are not necessarily drawn to scale.

DETAILED DESCRIPTION

In the following description of various examples of the invention, reference is made to the accompanying drawings, which form a part hereof, and in which are shown by way of illustration various example structures, systems, and steps in which aspects of the invention may be practiced. These aspects are indicative, however, of but a few of the various ways in which the principles of the invention may be employed and the present invention is intended to include all such aspects and their equivalents. It is to be understood that other specific arrangements of parts, structures, example devices, systems, and steps may be utilized, and structural and functional modifications may be made without departing from the scope of the present invention. Also, while the terms "top," "bottom," "front," "back," "side," and the like may be used in this specification to describe various example features and elements of the invention, these terms are used herein as a matter of convenience, e.g., based on the example orientations shown in the figures. Nothing in this specification should be construed as requiring a specific three-dimensional orientation of structures in order to fall within the scope of this invention.

The invention described herein relates to a vacuum relief valve for a railroad tank car, methods for reducing the risk of potential leaks due to debris that may enter into the vacuum relief valve, and methods of testing a vacuum relief valve that do not require removing the valve from the railroad tank car. In various embodiments, the vacuum relief valve may comprise a valve body that comprises side walls and a flanged portion, a valve stem, and a biasing component. In various embodiments, the valve stem may be slidably movable with respect to the valve body between an open position and a closed position. The valve stem may be secured in the closed position via the biasing component, which in various embodiments comprises a spring. The biasing component may be configured to maintain a predetermined maximum and/or minimum vacuum pressure within the railroad tank car. In various embodiments, the valve body may include one or more access openings that extend radially and outwardly from an interior cavity of the vacuum relief valve. In various embodiments, the vacuum relief valve may also include a cover selectively attached to the valve body and configured to rotate about a cover mounting fastener. According to one aspect of the invention, a vacuum relief valve described herein may be inspected for leaks without removing the vacuum relief valve from the railroad tank car by using the access opening(s) on the body of the vacuum relief valve. According to another aspect of the invention, a vacuum relief valve described herein may be inspected for leaks without removing the vacuum relief valve from the railroad tank car by using the opening to the interior cavity of the valve body that is revealed by rotating the cover from a closed position to an open position.

The vacuum relief valve and methods of inspecting a vacuum relief valve described herein are described with respect to vacuum relief valves affixed to railroad tank cars. However, it is to be understood that the vacuum relief valve and methods of inspecting the same may be equally applicable in other applications without departing from the scope of the invention described herein. For example, the vacuum relief valve described herein may also be utilized in other applications, such as in other applications involving tanks or other storage containers to which a vacuum relief valve may be installed.

Figure 1:
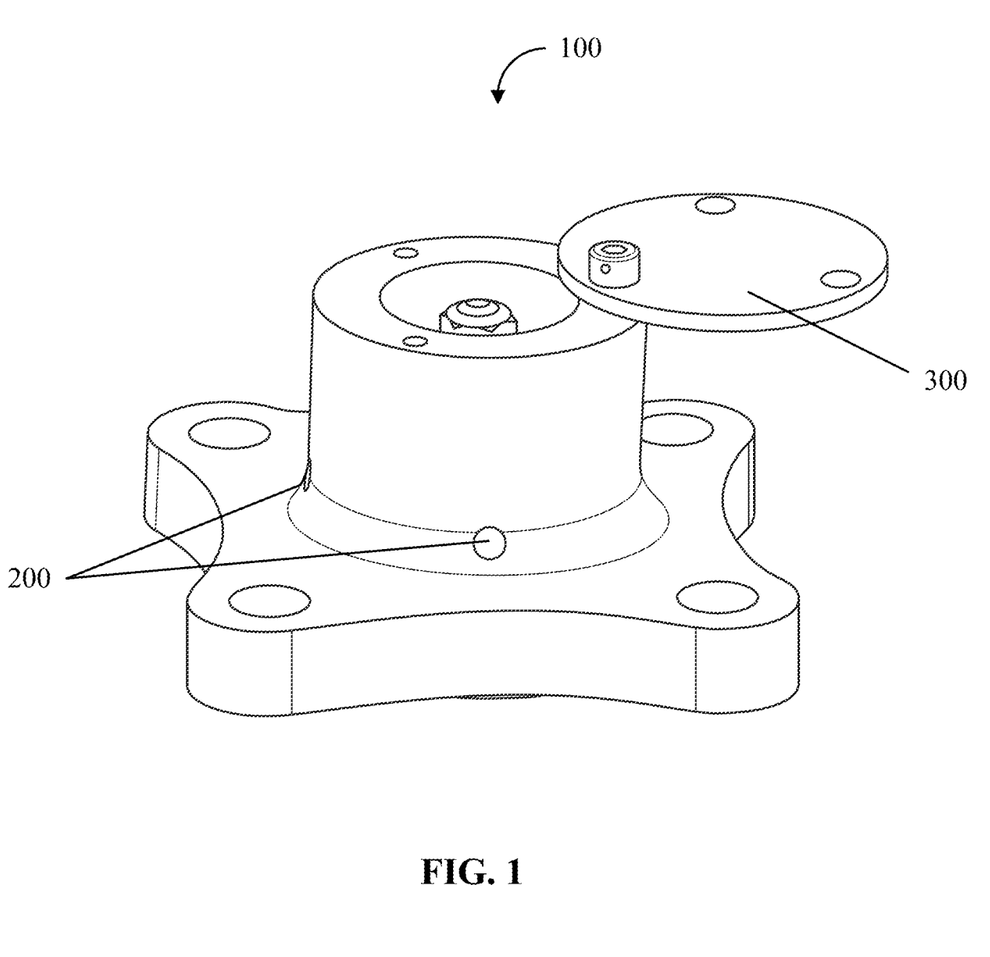
FIG. 1 depicts a perspective view of an example vacuum relief valve for a railroad tank car, according to one or more aspects described herein.

FIG. 1 depicts a perspective view of an example vacuum relief valve 100 for a railroad tank car, according to one or more aspects described herein. In various embodiments, vacuum relief valve 100 may include one or more access openings 200, a cover 300, and/or one or more other components. In various embodiments, vacuum relief valve 100 may be configured to allow for its inspection without requiring removal of the valve from the railroad tank car or from a protective housing in which it is affixed. Accordingly, vacuum relief valve 100 may be designed to minimize the time, cost, and energy needed to inspect for leaks.

Figure 2:
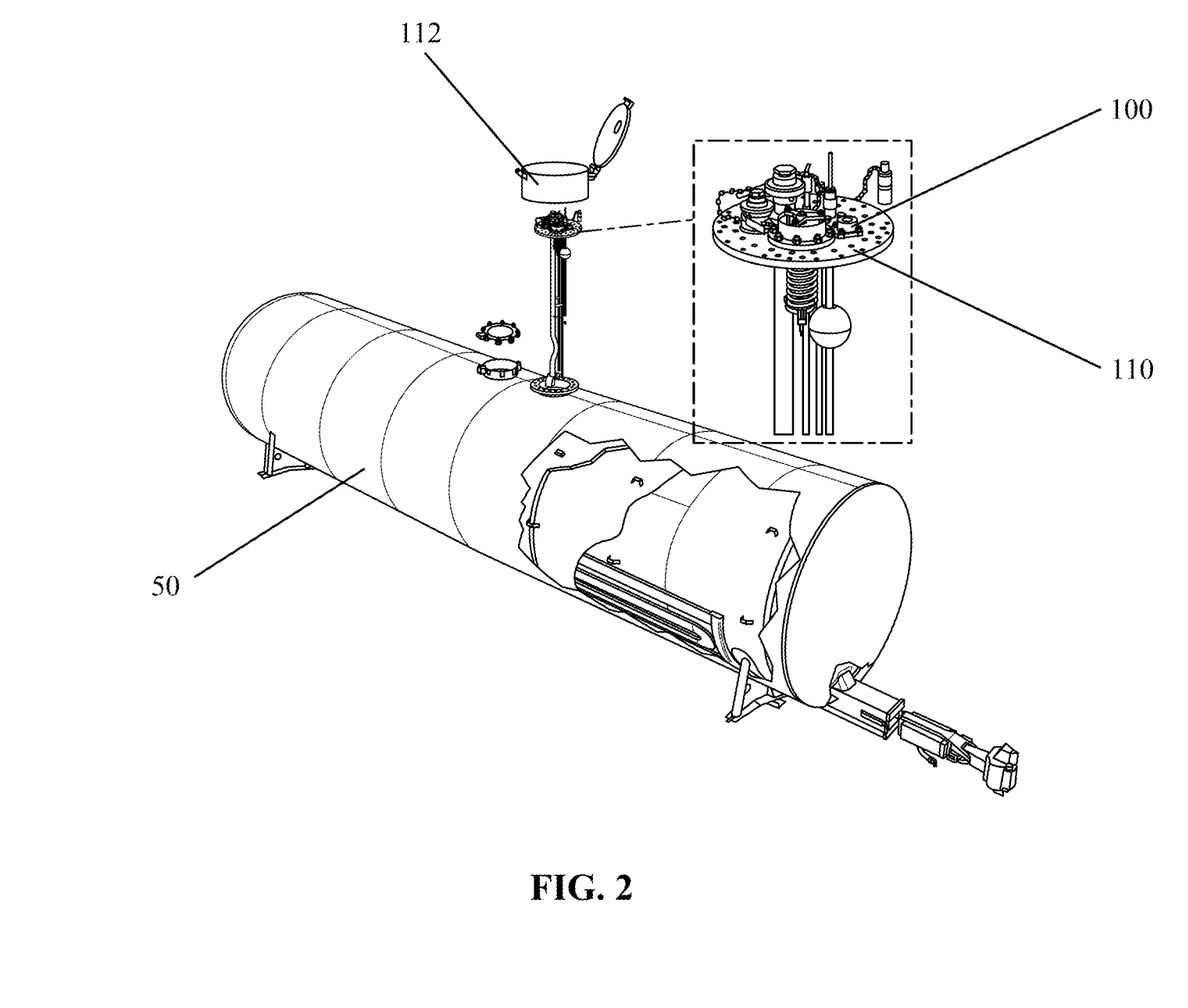
FIG. 2 depicts a perspective view of an example installation of a vacuum relief valve described herein on a railroad tank car, according to one or more aspects described herein.

In various embodiments, vacuum relief valve 100 may be installed on a railroad tank car at an opening on top of the railroad tank car. For example, FIG. 2 depicts an example embodiment in which vacuum relief valve 100 is installed on a top side of a railroad tank car 50, according to one or more aspects described herein. In some embodiments, vacuum relief valve 100 may be affixed to a fittings flange 110, which is positioned over a hole in the top of railroad tank car 50. In some embodiments, one or more additional components may also be affixed to fittings flange 110, as depicted in FIG. 2. Accordingly, fittings flange 110 may be configured to enable vacuum relief valve 100 and/or one or more other components to be integrated with railroad tank car 50. The one or more additional components affixed to fittings flange 110 may include, for example, a gauging device, a vapor valve, a liquid valve, a safety valve, and/or one or more other components. In some embodiments, the fittings flange 110 (and/or vacuum relief valve 100) may be protected by a protective housing assembly 112 affixed to railroad tank car 50 and configured to both protect and provide access to the one or more components affixed to fittings flange 110, as depicted in FIG. 2.

Figure 3A:
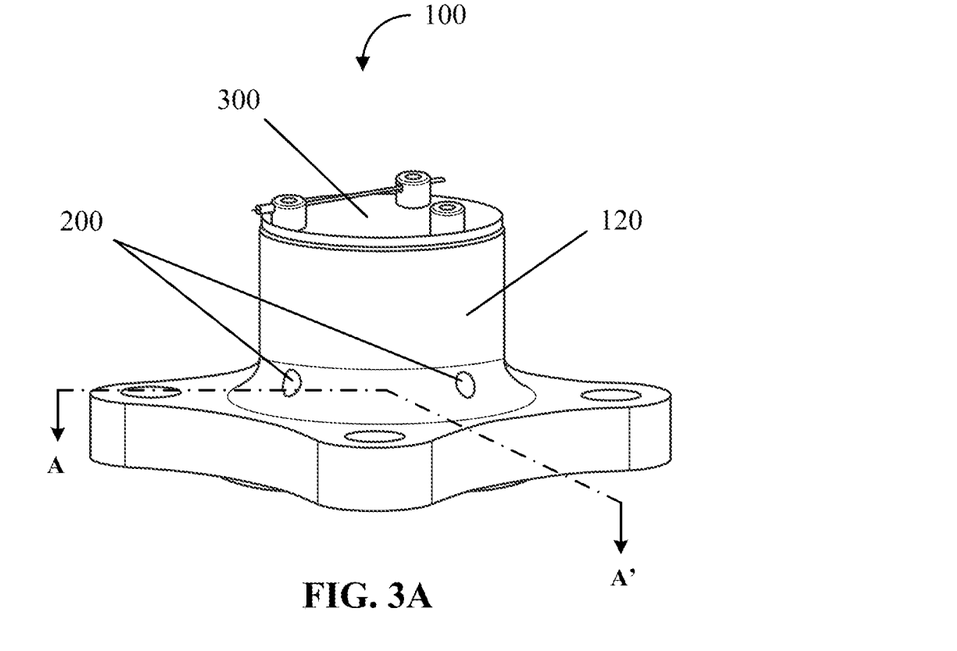
FIGS. 3A-B depict perspective views of an example vacuum relief valve, according to one or more aspects described herein.
Figure 3B:
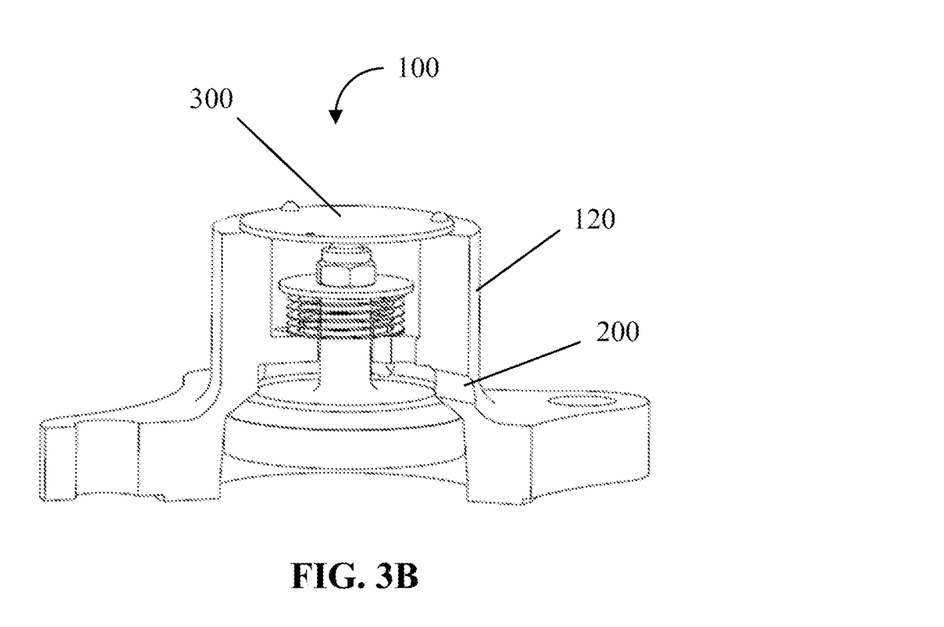

FIGS. 3A-B depict perspective views of vacuum relief valve 100, according to one or more aspects described herein. For example, FIG. 3A depicts a perspective view of vacuum relief valve 100, and FIG. 3B depicts a cross-sectional view of vacuum relief valve 100 as depicted shown in FIG. 3A along a line A-A'. In various embodiments, the one or more access openings 200 and/or cover 300 may be integrated in the valve body 120 of vacuum relief valve 100 to allow vacuum relief valve 100 to be inspected without removing vacuum relief valve 100 from a railroad tank car (e.g., railroad tank car 50 depicted in FIG. 2). In some embodiments, valve body 120 of vacuum relief valve 100 may be substantially cylindrical with a flanged portion at the base to mount vacuum relief valve 100 to the top or a side of a railroad tank car. As described herein, in various embodiments, valve body 120 may include at least side walls 122 and a flanged portion 124. In various embodiments, an interior of vacuum relief valve 100 may have a circular shape (e.g., when viewed from a vertical cross-sectional view. In other embodiments, however, the interior of vacuum relief valve 100 may be a non-circular, rectangular, polygonal, triangular, oval, or any other combination of appropriate shapes without departing from the scope of the invention described herein.

Figure 4A:
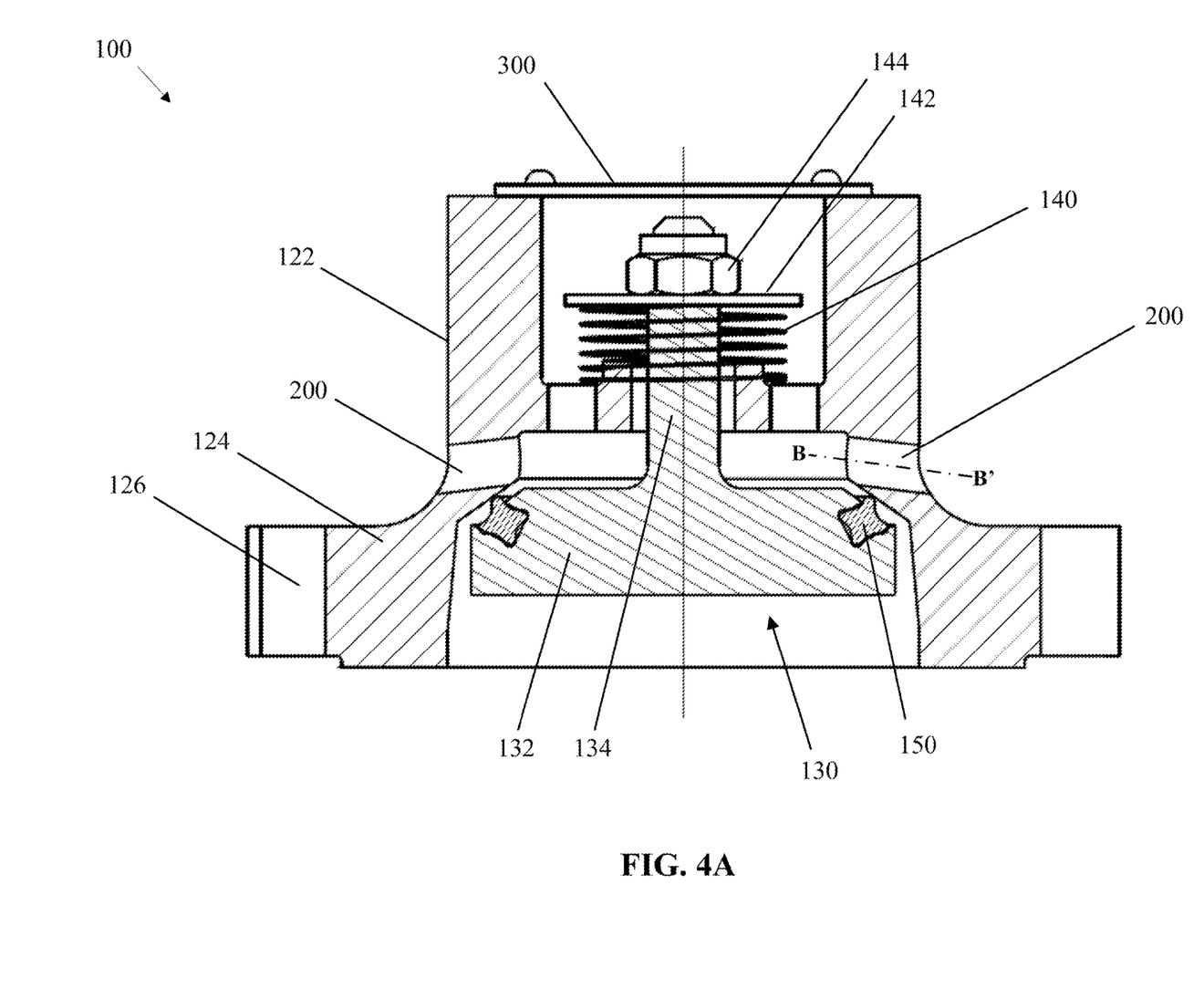
FIGS. 4A-C depict various cross-sectional views of an example vacuum relief valve, according to one or more aspects described herein.
Figure 4B:
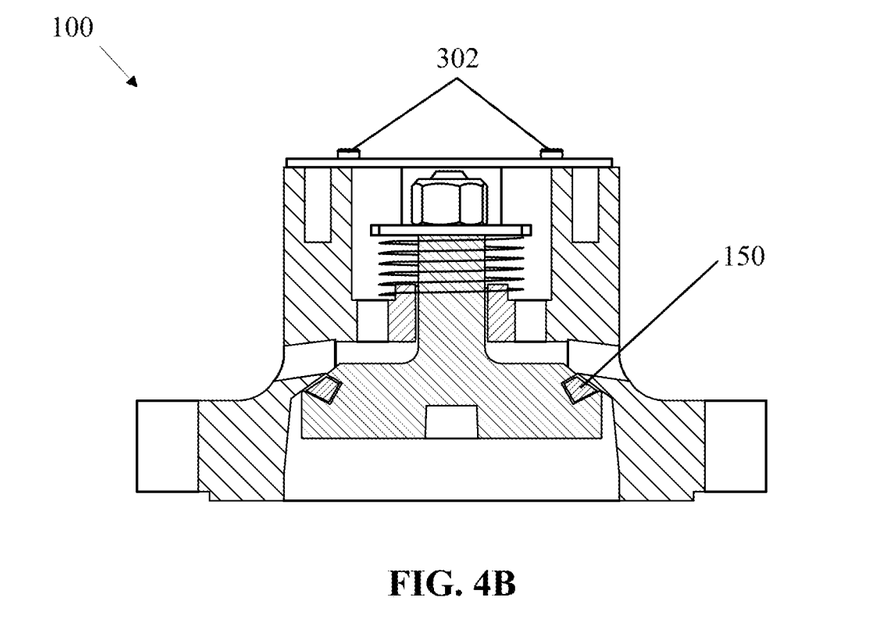
Figure 4C:
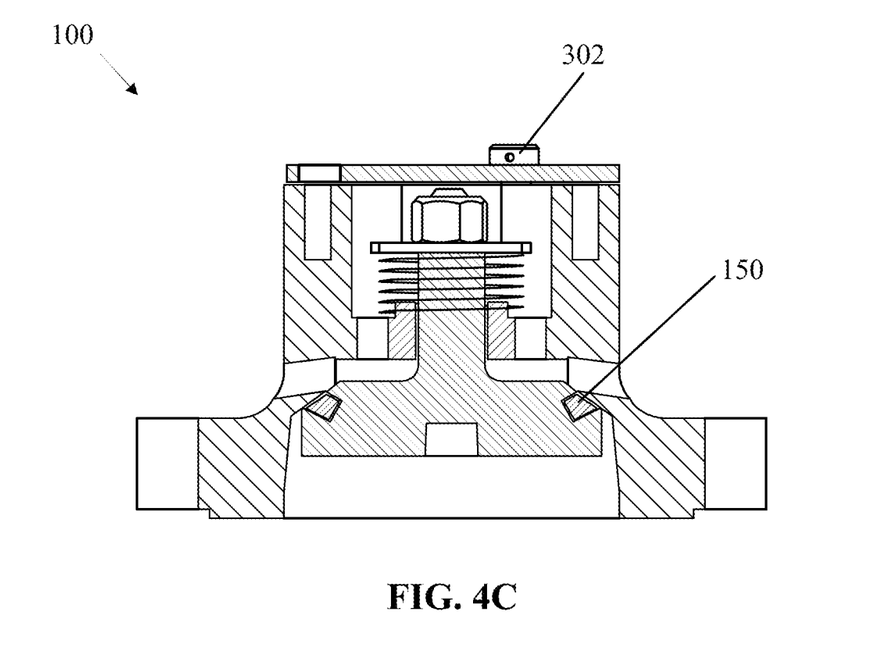

FIGS. 4A-C depict various cross-sectional views of vacuum relief valve 100, according to one or more aspects described herein. As depicted in FIGS. 4A-C, vacuum relief valve 100 may include a valve body (e.g., valve body 120) having at least side walls 122 and a flanged portion 124, a valve stem 130, a biasing component 140, and/or one or more other components. In various embodiments, flanged portion 124 may include one or more mounting holes 126 configured to receive bolts, screws, and/or other types of fasteners used to secure vacuum relief valve 100 to a railroad tank car. For example, the one or mounting holes 126 of flanged portion 124 may be configured to receive bolts, screws, and/or other types of fasteners used to removably attach vacuum relief valve 100 to a fittings flange 110 of a railroad tank car. Accordingly, in various embodiments, vacuum relief valve 100 may be securely attached to a railroad tank car via the one or more mounting holes 126 of flanged portion 124. In other embodiments, vacuum relief valve 100 may be securely attached to a railroad tank car via flanged portion 124 using one or more techniques described herein and/or using any other now known or future developed fastening technique. For example, a bolt or rivet fastening configuration may be utilized on a top or side of a railroad tank car to receive the flanged portion 124 of vacuum relief valve 100. While a flanged vacuum relief valve is described herein, it should be understood that any appropriate modification of the flanged portion 124 may be contemplated and is within the scope of the invention described herein. In various embodiments, side walls 122 of vacuum relief valve 100 may form an opening at an end of valve body 120 opposite flanged portion 124. In various embodiments, cover 300 may be attached to the end of side walls 122 forming the opening opposite the flanged portion 124.

In various embodiments, valve stem 130 may be mated to and received within an opening of valve body 120. As depicted in FIG. 4A, in various embodiments, valve stem 130 may comprise a stem base 132 and a stem body 134 that extends upwards within vacuum relief valve 100. For example, as depicted in FIG. 4A, stem body 134 may be configured to extend away from stem base 132 along an axis perpendicular to a wall of the railroad tank car to which vacuum relief valve 100 is mounted. In various embodiments, valve stem 130 may be slidably movable with respect to valve body 120 between an open position and a closed position. In various embodiments, valve stem 130 may be secured in the closed position via a biasing component 140. In various implementations, biasing component 140 may comprise a spring. For example, biasing component 140 may comprise a wave spring, a compression force spring, or any other suitable type of spring. In various embodiments, the stem body of valve stem 130 may include a threaded portion configured to receive a biasing washer 142 and/or a biasing fastener 144. The biasing washer 142 and/or biasing fastener 144 may be configured to securely fasten biasing component 140 to valve body 120 and/or valve stem 130. In some embodiments, biasing component 140 may be adjusted to maintain a predetermined maximum and/or minimum vacuum pressure within the railroad tank car. For example, biasing component 140 may be adjusted to between approximately −0.75 and −6 pounds per square inch gauge (PSIG). In some embodiments, the threaded portion of valve stem 130 may be mated to biasing fastener 144 using any appropriate configuration. For example, biasing fastener 144 may be any appropriate fastening component. In an example embodiment, biasing fastener 144 may comprise a locking nut, as depicted in FIG. 4A. In some embodiments, stem base 132 may include a groove, notch, or other type of depression configured to receive a ring 150 configured to seal off railroad tank car at vacuum relief valve 100 when valve stem 130 is in a closed position. For example, ring 150 may comprise a quad ring or O-ring configured to form a seal when valve stem 130 is in a closed position. In some embodiments, ring 150 may be constructed of an elastomer material that can deform to fill surface imperfections in a groove of valve stem 130 and the interior of stem body 120, thereby enabling tighter sealing of vacuum relief valve 100.

As described herein, vacuum relief valve 100 may be configured to allow for improved control of a process for inspecting the valve when attached to a railroad tank car. For example, vacuum relief valve 100 may be configured to allow it to be inspected for a potential leak without requiring its removal from the railroad tank car or requiring disassembling any components on the valve or the railroad tank car itself. In various embodiments, valve body 120 of vacuum relief valve 100 may include one or more access openings 200. In some embodiments, the one or more access openings 200 may be located proximate or adjacent to the beginning of flanged portion 124 of valve body 120. In various embodiments, the one or more access openings 200 may extend radially and outwardly from an interior cavity of vacuum relief valve 100. For example, the one or more access openings 200 may extend along a line B-B', as depicted in FIG. 4A. In other embodiments, the one or more access openings 200 may extend radially and outwardly downward along a curved path. In some embodiments, the one or more access openings 200 may comprise a cylindrical opening at one or both ends (e.g., the end terminating at the interior cavity of valve body 120 or the end terminating at the outer edge of side wall 122 of valve body 120). For example, as depicted in FIG. 4A, a diameter of one end of one or more access openings 200 may be the same diameter of the other end of one or more access openings 200 along a line B-B'. In other embodiments, the two or more access openings 200 may be a frustoconical opening. For example, a diameter of one end of one or more access openings 200 may be a different diameter of the other end of one or more access openings 200 along a line B-B'. In some embodiments, the one or more access openings 200 may include a surface profile to enhance the flow of the leak detection fluid injected from inside of the side wall 122 towards the outside of the valve body 120.

In order to inspect vacuum relief valve 100, a leak detection fluid (or other leak detection substance) may be injected into one of the one or more access openings 200. For example, and as described herein with respect to FIG. 7, all but one of the two or more access openings 200 may be plugged or otherwise sealed. A leak detection fluid (or other leak detection substance) may then be injected through the one remaining unsealed access opening 200 from the outside of vacuum relief valve 100. If there is a leak within vacuum relief valves 100, bubbles would appear coming out of any of the one or more access openings 200 indicating that air was escaping into the atmosphere. After inspection of vacuum relief valve 100 is complete, each of the one or more access openings 200 may be unplugged or otherwise unsealed and any leak detection fluid (or other leak detection substance) injected may be cleaned and removed.

Figure 8:
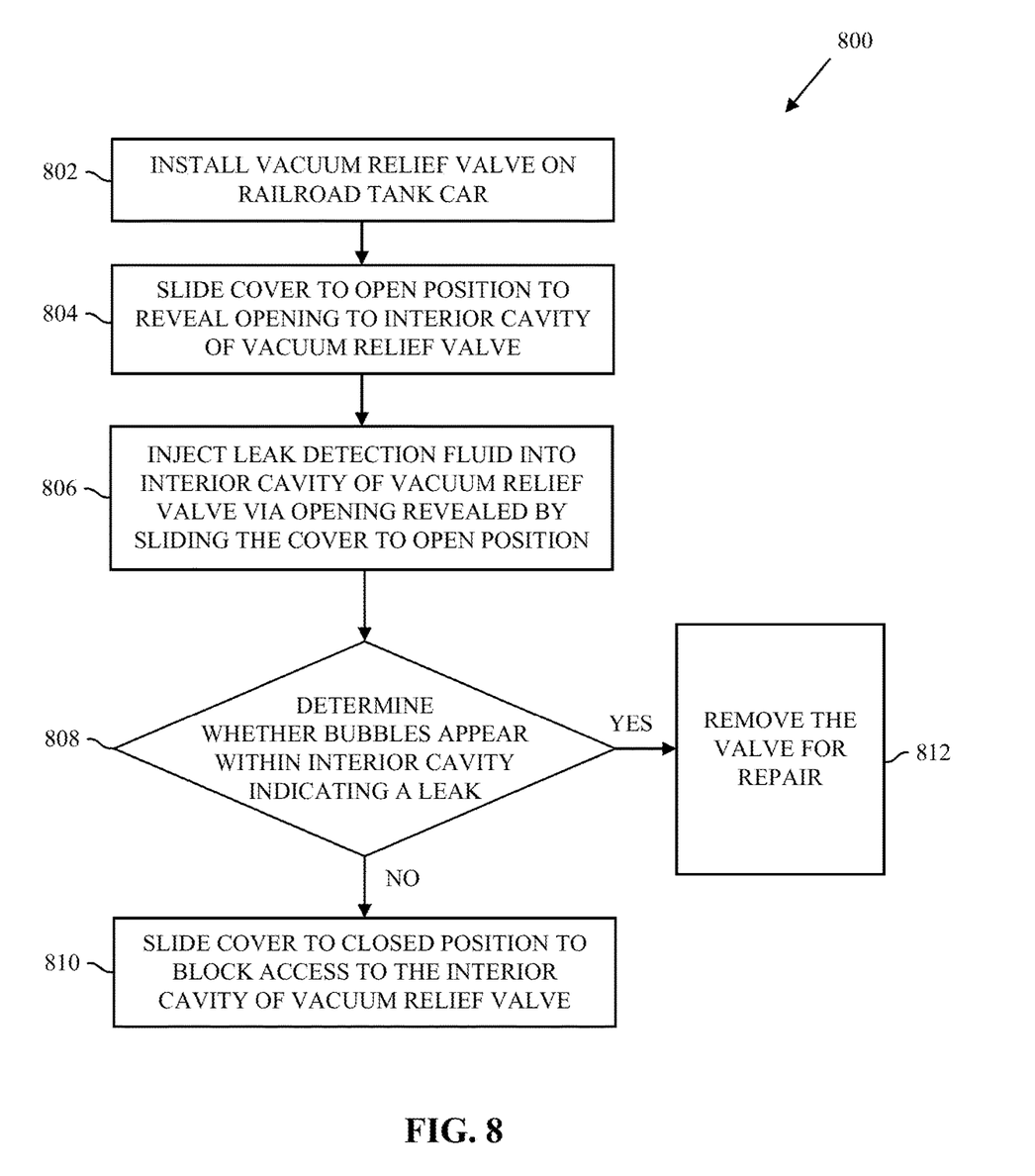
FIG. 8 depicts a flow diagram of an example method for inspecting a vacuum relief valve mounted to a railroad tank car for leaks using an opening revealed by rotating a cover of the vacuum relief valve and without removing the vacuum relief valve from the railroad tank car, according to one or more aspects described herein.

In an alternative embodiment, vacuum relief valve 100 may be inspected for a leak by injecting a leak detection fluid (or other leak detection substance) directly into the interior cavity formed by side walls 122 of valve body 120 via the opening accessed by rotating (or sliding) cover 300 to an open position, ss described herein with respect to FIG. 8. For example, cover 300 may be slidably rotated from a closed position to an open position to reveal an opening to the interior cavity of vacuum relief valve 100. When leak detection fluid is injected via the opening revealed by sliding cover 300 to an open position, the interior cavity may be visually inspected for bubbles that would indicate that air was escaping into the atmosphere. After inspection of vacuum relief valve 100 is complete, cover 300 may be slidably rotated back to a closed position and secured to valve body 120 as described herein. In some embodiments, the foregoing method of inspecting vacuum relief valve 100 for leaks by injecting leak detection fluid directly into the interior cavity via the opening at the top of vacuum relief valve 100 (i.e., without injecting leak detection fluid into an access opening 200) may be utilized in embodiments in which vacuum relief valve 100 does not comprise access openings 200.

In various embodiments, cover 300 may be affixed to a top side of valve body 120 (and vacuum relief valve 100) using one or more cover mounting fasteners 302. For example, FIG. 4B depicts an embodiment of vacuum relief valve 100 in which cover 300 is attached to valve body 120 via one or more screws 302, and FIG. 4C depicts an embodiment of vacuum relief valve 100 in which cover 300 is attached to valve body 120 via a bolt 302. It is to be understood, however, that the one or more cover mounting fasteners 302 may comprise one or more screws, bolts, and/or any other type of fastener now known or future developed without departing from the scope of the invention described herein.

Figure 5A:
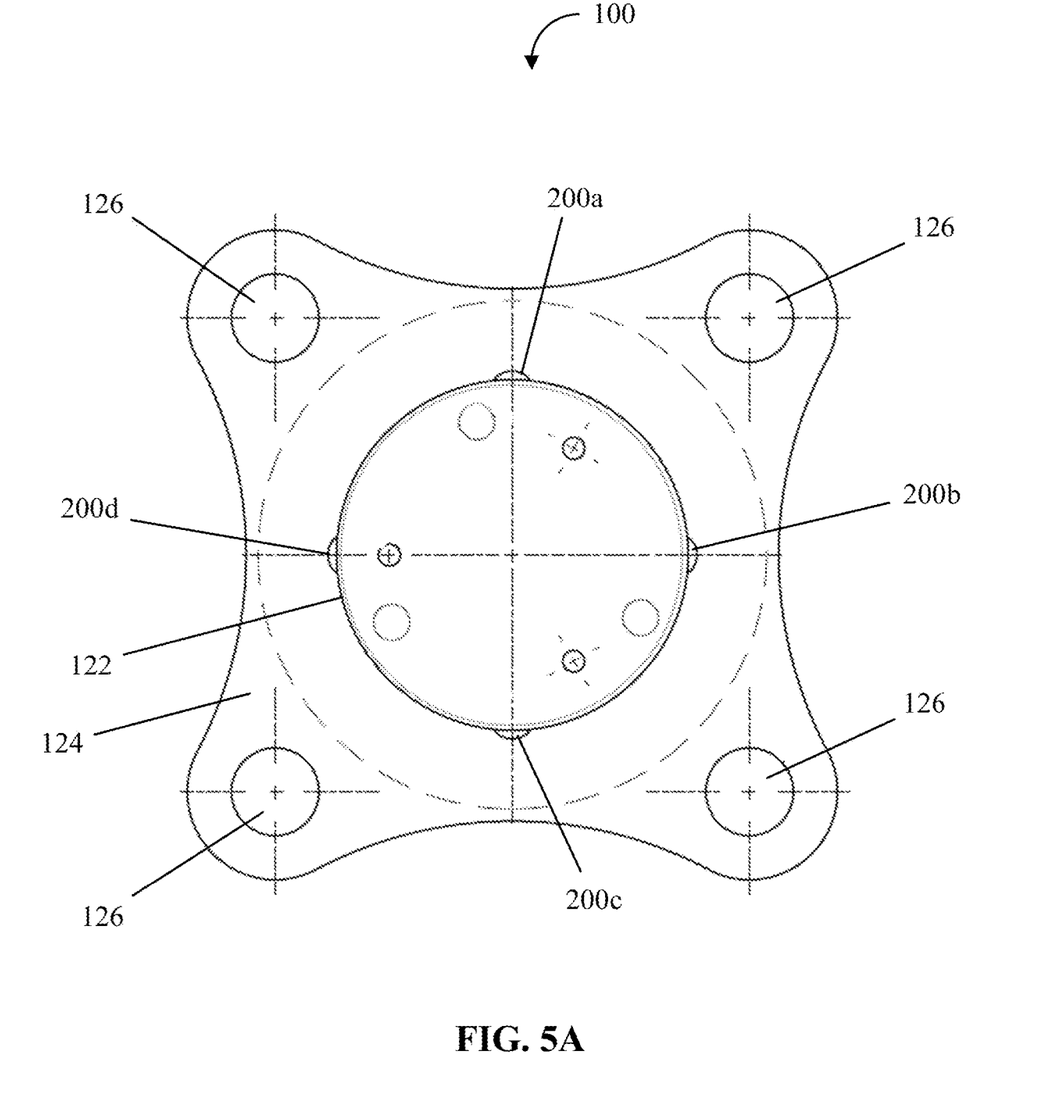
FIGS. 5A-C depict various top views of an example vacuum relief valve, according to one or more aspects described herein.
Figure 5B:
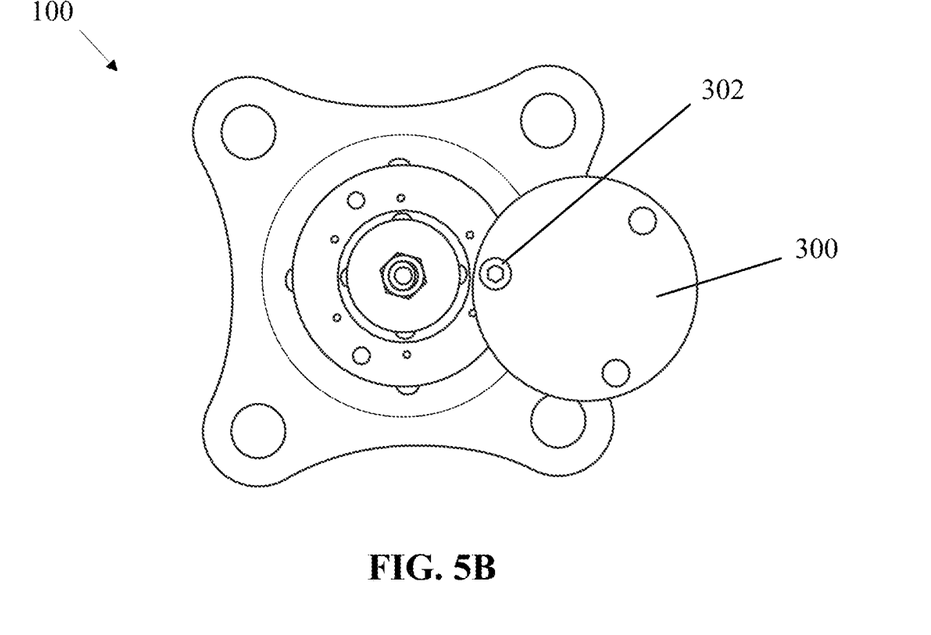
Figure 5C:
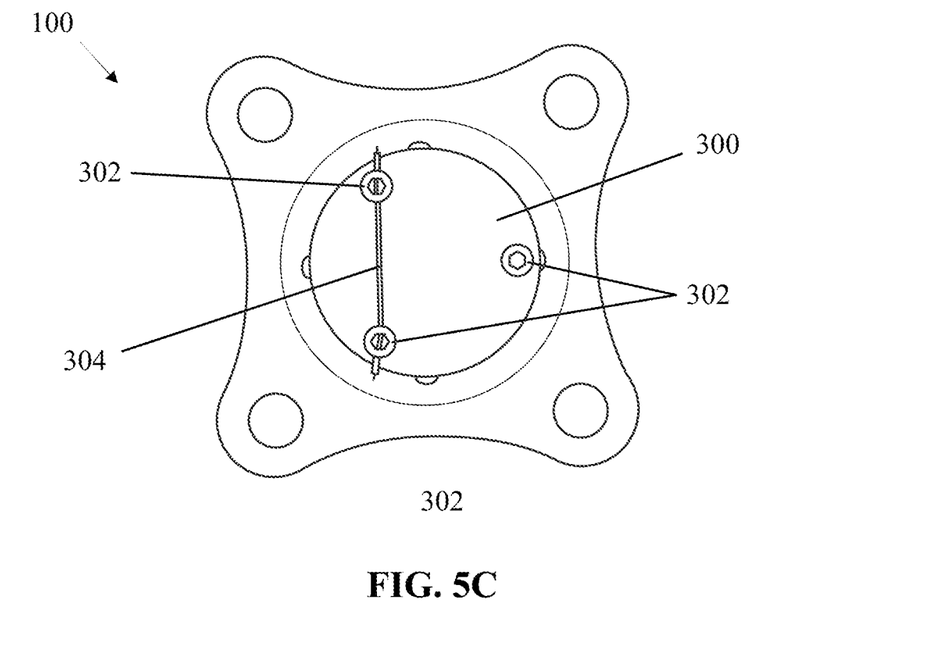

FIGS. 5A-C depict various top views of vacuum relief valve 100, according to one or more aspects described herein. In various embodiments, the one or more access openings 200 may include any suitable number of access openings. For example, as depicted in FIG. 5A, the one or more accessing openings 200 may include four access openings 200a, 200b, 200c, and 200d. In various embodiments, the one or more access openings 200 may be equally spaced apart circumferentially around an outer side of valve body 120. For example, an angle between neighboring access openings of the four access openings 200a, 200b, 200c, and 200d may be roughly 90 degrees, as depicted in FIG. 5A. In some embodiments, a height of each access opening 200 on side wall 122 of valve body 120 (e.g., from a bottom surface of vacuum relief valve 100) may be roughly the same for each of the one or more access openings 200. In other embodiments, a height of one or more individual access openings 200 on side wall 122 of valve body 120 may be different from the height of one or more other access openings 200.

In various embodiments, cover 300 may be selectively attached to valve body 120. For example, cover 300 may be selectively attached to valve body 120 via one or more cover mounting fasteners 302. As described herein, cover 300 of vacuum relief valve 100 may be configured to rotate about a cover mounting fastener 302. For example, cover 300 may be configured to rotate about a single cover mounting fastener 302 as a pivot point. When cover 300 is rotated to an open position, as depicted in FIG. 5B, an interior cavity of valve body 120 may be accessed.

When there is no leak, access to the interior cavity of valve body 120 may be blocked by rotating the cover about the cover mounting fastener 302 and further securing cover 300 as described herein. For example, when cover 300 is in a closed position, cover 300 may be secured again using one or more cover mounting fasteners 302. In various embodiments, cover 300 may include one or more holes configured to receive a cover mounting fastener 302. In an example embodiment, cover 300 may be configured to receive three cover mounting fasteners 302 via holes on cover 300. In various embodiments, cover 300 may be further secured using safety cable 304 that extends between at least two cover mounting fasteners 302 used to secure cover 300 to valve body 120, as depicted in FIG. 5C. In some embodiments, safety cable 304 may be affixed between two cover mounting fasteners 302 using at least one ferrule. In some embodiments, safety cable 304 may represent a tamper evident seal that indicates whether vacuum relief valve 100 has been accessed or otherwise tampered with.

FIGS. 6A-E depict various views of vacuum relief valve with a screen assembly 400, according to one or more aspects described herein. In various embodiments, screen assembly 400 of the vacuum relief valve 100 may comprise an air-filter screen 404 to prevent debris from reaching the vacuum relief valve, a screen cover 406 to protect the air-filter screen, and one or more filter components that surround the outer edge of side wall 122 of valve body 120 to prevent debris entering into the vacuum relief valve through one or more accessing openings 200. In addition, a screen cover 406 described herein may further reduce risk of debris entering into the vacuum relief valve by elevating intake ports to minimize debris concentration in the airflow stream into the vacuum relief valve.

Figure 6A:
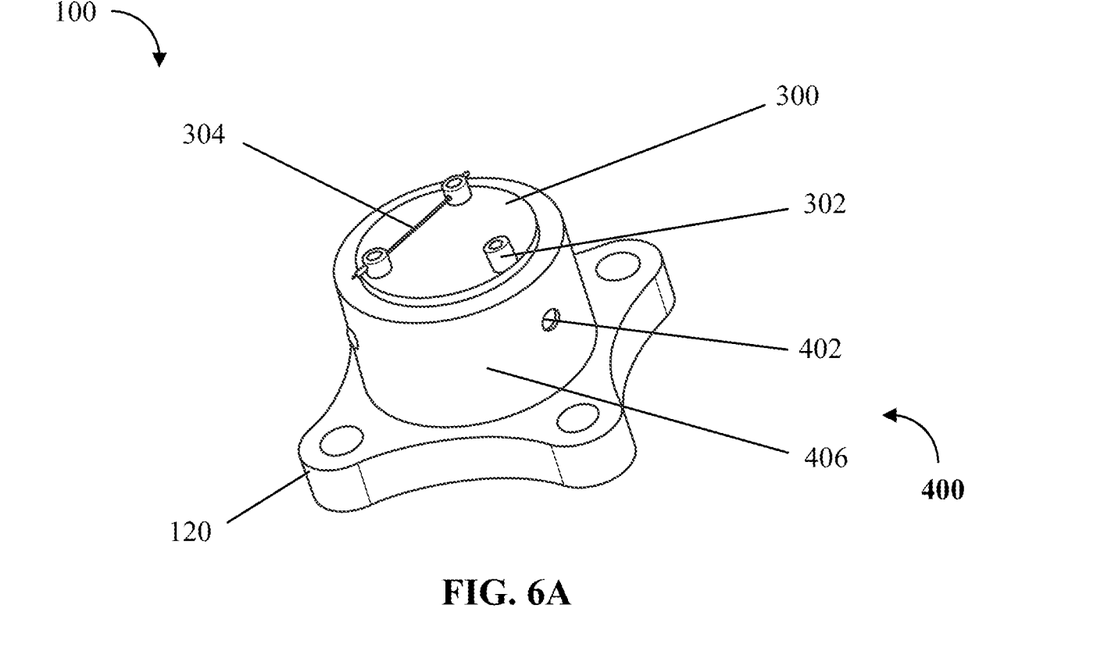
FIGS. 6A-E depict various views of an example vacuum relief valve with a screen assembly, according to one or more aspects described herein.
Figure 6B:
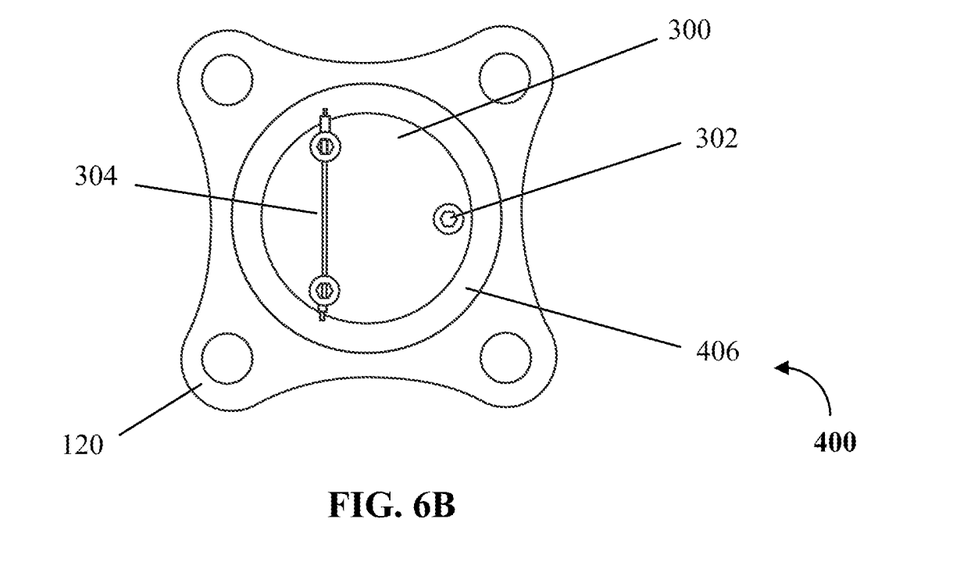

In various embodiments, screen assembly 400 may be securely attached to valve body 120 (and vacuum relief valve 100) using cover 300 and one or more cover mounting fasteners 302. For example, in some embodiments (e.g., as depicted in FIGS. 6A-B), screen assembly 400 may be slidably inserted from top of valve body 120 and attached to the valve body via cover 300, one or more screws 302, and/or sealed with safety cable 304. In other embodiments, screen assembly 400 may be positioned surrounding the valve body 120 and attached to anywhere outside of valve body by any appropriate fastening configuration. In various embodiments, screen assembly 400 may be configured to include one or more screen access openings 402 integrated in screen cover 406 to allow airflow 408 to be directed into the vacuum relief valve 100 through one or more accessing openings 200.

Figure 6C:
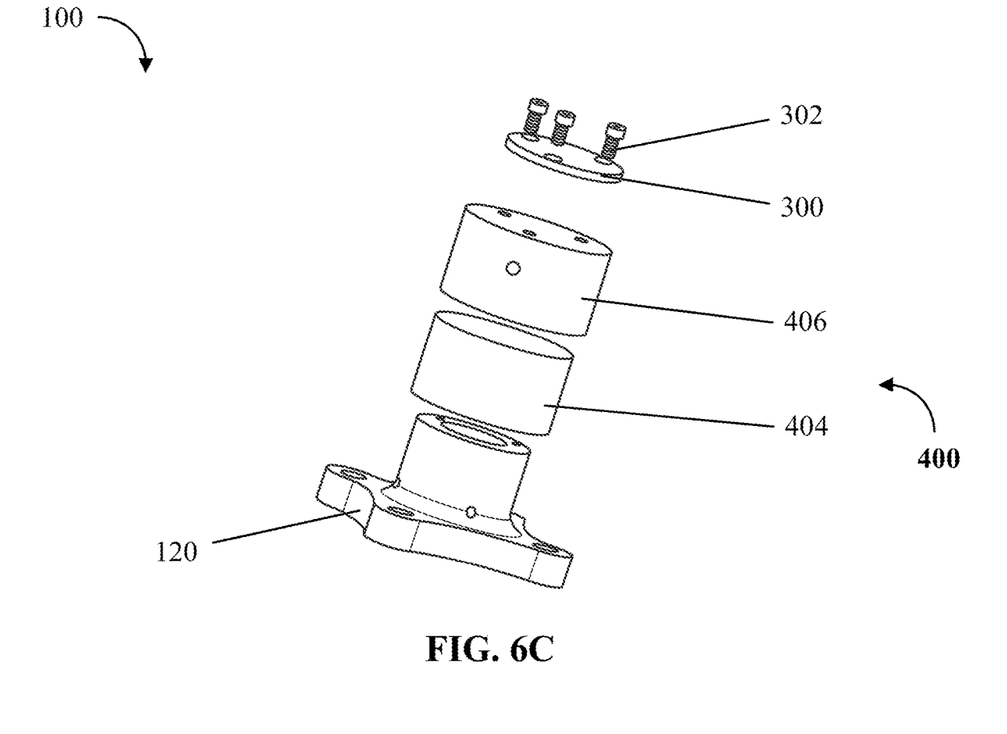
Figure 6D:
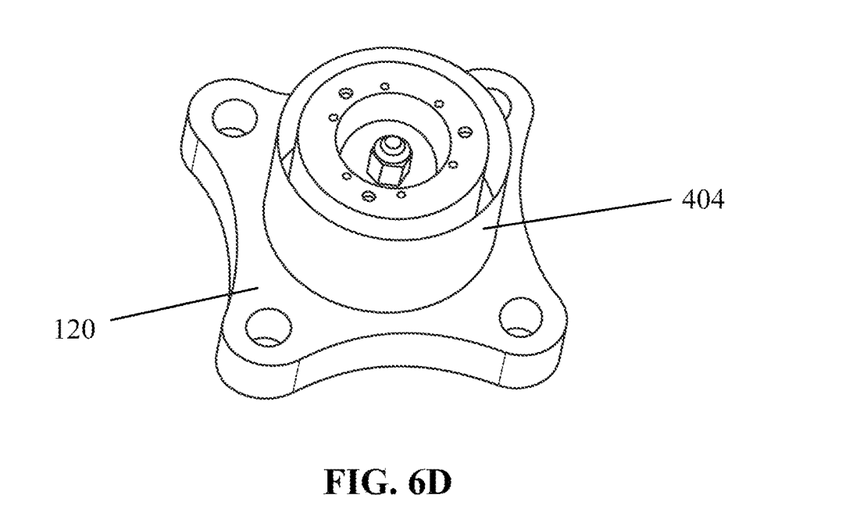

FIG. 6C depicts an exploded view of the vacuum relief valve with a screen assembly 400, according to one or more aspects described herein. In some embodiments, air-filter screen 404 may be made of and/or with any appropriate type of mesh construction with a size of mesh selected to limit the size of debris particles that can enter into the vacuum relief valve. In other embodiments, air-filter screen 404 may be made of and/or include any appropriate type of wire mesh coupled with one or more filter media layers based on anticipated size of debris particles to be prevented from entering into the vacuum relief valve. FIG. 6D depicts a perspective view of an example air-filter screen 404 without a screen cover 406 that fits and surrounds an outer edge of side wall of valve body 120. As depicted in FIG. 6C, screen cover 406 may then be slidably inserted over the air-filter screen 404 from top of valve body 120 and attached to the valve body via cover 300, one or more screws 302, and/or sealed with safety cable 304.

Figure 6E:
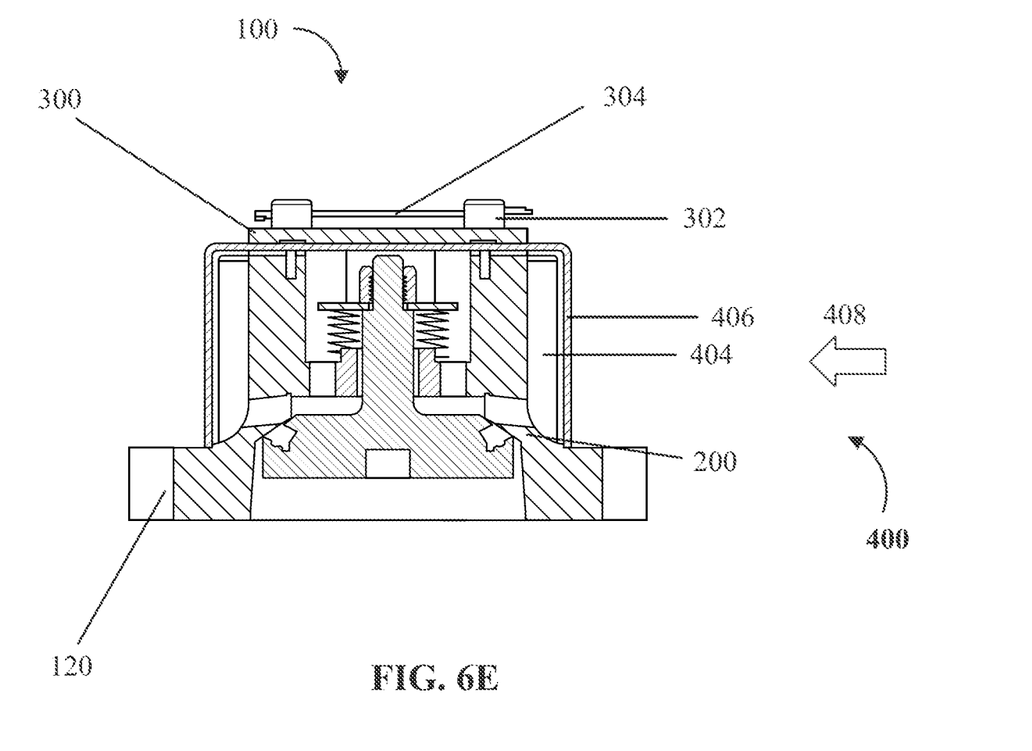

FIG. 6E depicts a cross-sectional view of the vacuum relief valve with air-filter screen 404 and screen cover 406 (i.e., screen assembly 400), indicating a direction of airflow 408 passing through the air-filter screen 404. In various embodiments, airflow 408 may be directed into the vacuum relief valve through one or more screen access openings 402 (shown in FIG. 6A). Using mesh of air-filter screen 404, airflow 408 directed into the vacuum relief valve may be configured to filter debris when the air passes through the air-filter screen 404 and enters into the vacuum relief valve. The vacuum relief valve would function the same way with or without the air-filter screen 404 and screen cover 406 except that the airflow 408 that enters into the vacuum relief valve is filtered by air-filter screen 404. Filtering the air including debris may greatly reduce the risk of potential leaks due to debris entering into the vacuum relief valve.

In various embodiments, screen cover 406 may include one or more portions with a vertically varying profile. For example, the vertically varying profile may be present in portion of screen cover 406 extending along the y-axis. However, in some embodiments, a horizontally varying profile may be present in portion of screen cover 406 extending along the x- and z-axes to further reduce risk of debris entering into the vacuum relief valve via one or more access openings 200. In various embodiments, screen cover 406 may be made of and/or with any appropriate type of sealing material. In various embodiments, when secured to vacuum relief valve 100, screen cover 406 may be in contact with body 120 at a bottom edge of screen cover 406, such that a debris tight seal is formed by the contact of screen cover 406 and body 120.

Figure 7:
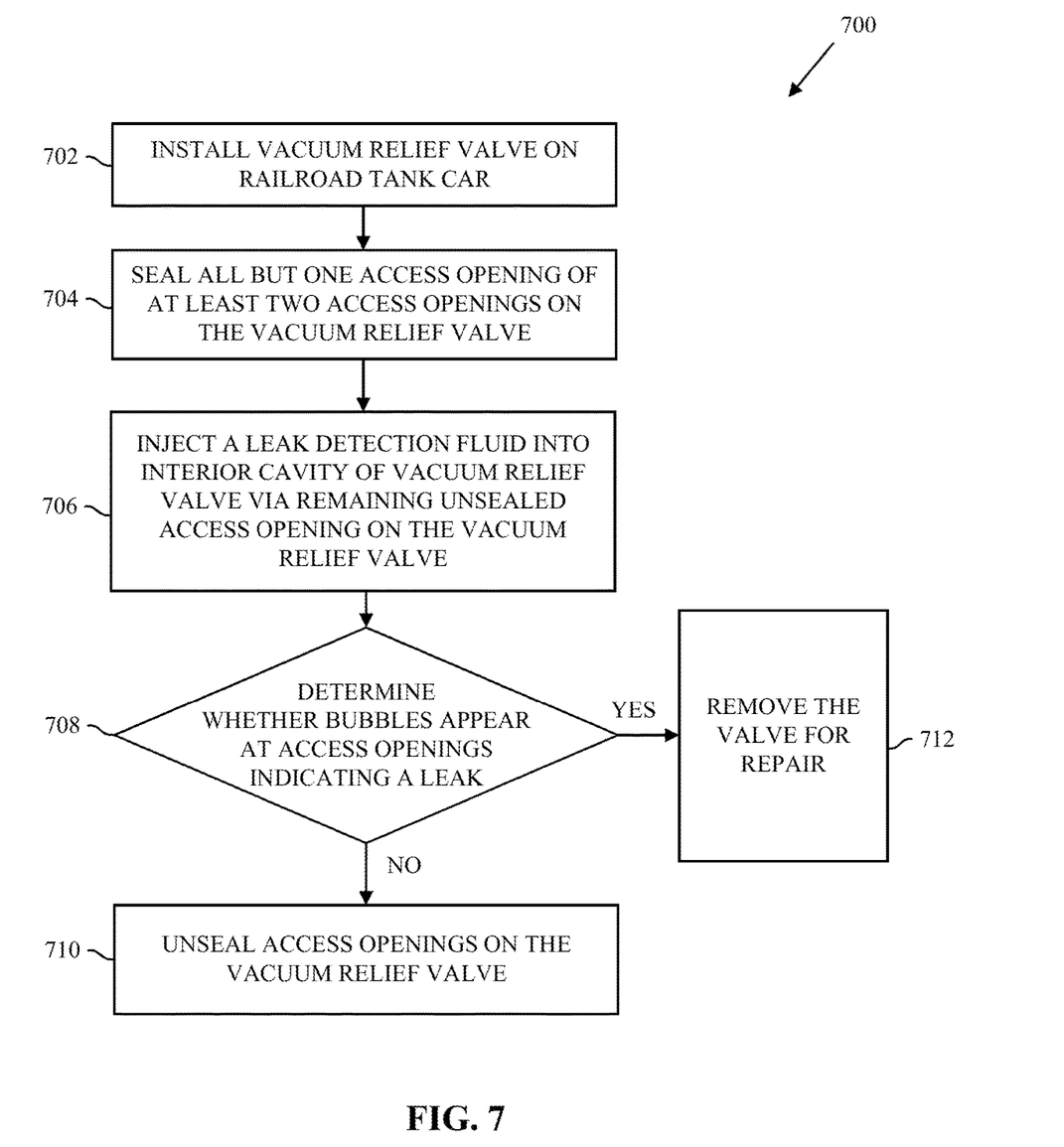
FIG. 7 depicts a flow diagram of an example method for inspecting a vacuum relief valve mounted to a railroad tank car for leaks using access openings on the body of the vacuum relief valve and without removing the vacuum relief valve from the railroad tank car, according to one or more aspects described herein.

FIG. 7 illustrates an example of a process 700 for inspecting a vacuum relief valve mounted to a railroad tank car for leaks using access openings on the body of the vacuum relief valve and without removing the vacuum relief valve from the railroad tank car, according to one or more aspects described herein. The operations of process 700 presented below are intended to be illustrative and, as such, should not be viewed as limiting. In some implementations, process 700 may be accomplished with one or more additional operations not described, and/or without one or more of the operations discussed. In some implementations, two or more of the operations of process 700 may occur substantially simultaneously. The described operations may be accomplished using some or all of the components described in detail above with respect to vacuum relief valve 100.

In an operation 702, process 700 may include installing a vacuum relief valve on a railroad tank car. For example, the vacuum relief valve may comprise vacuum relief valve 100 and may be installed and secured to the railroad tank car as described herein. In an operation 704, process 700 may include inserting a plug or otherwise sealing all but one of two or more access openings that are located on the body of the vacuum relief valve and extend into an interior cavity of the body of the vacuum relief valve. In an operation 706, process 700 may include injecting a leak detection fluid into the interior cavity of the body of the vacuum relief valve via the remaining unsealed access opening on the vacuum relief valve. In an operation 708, process 700 may include determining whether one or more bubbles appear at any of the access openings located on the body of the vacuum relief valve. The presence of one or more bubbles formed at any of the access openings would indicate that air was escaping into the atmosphere. In an operation 710, process 700 may include unsealing the access openings located on the body of the vacuum relief valve based on the determination that there is no leak because no bubbles formed at any of the access openings. In an operation 712, process 700 may include removing the vacuum relief valve for repair based on the determination that there is a leak because bubbles formed at any of the access openings. After each attempt to repair the valve, at least operations 706 and 708 may be repeated until no bubbles form indicating that there are no leaks in the valve.

FIG. 8 illustrates an example of a process 800 for inspecting a vacuum relief valve mounted to a railroad tank car for leaks using an opening revealed by rotating a cover of the vacuum relief valve and without removing the vacuum relief valve from the railroad tank car, according to one or more aspects described herein. The operations of process 800 presented below are intended to be illustrative and, as such, should not be viewed as limiting. In some implementations, process 800 may be accomplished with one or more additional operations not described, and/or without one or more of the operations discussed. In some implementations, two or more of the operations of process 800 may occur substantially simultaneously. The described operations may be accomplished using some or all of the components described in detail above with respect to vacuum relief valve 100.

In an operation 802, process 800 may include installing a vacuum relief valve on a railroad tank car. For example, the vacuum relief valve may comprise vacuum relief valve 100 and may be installed and secured to the railroad tank car as described herein. In an operation 804, process 800 may include sliding a cover of vacuum relief valve to an open position to reveal an opening to the interior cavity of vacuum relief valve. In an operation 806, process 800 may include injecting a leak detection fluid into the interior cavity of the body of the vacuum relief valve via the opening to the interior cavity of vacuum relief valve revealed by sliding the cover to an open position. In an operation 808, process 800 may include determining whether one or bubbles appear within the interior cavity of the vacuum relief valve. The presence of one or more bubbles formed within the interior cavity would indicate that air was escaping into the atmosphere. In an operation 810, process 800 may include sliding cover to a closed position to block access to the interior cavity of the vacuum relief valve based on the determination that there is no leak because no bubbles formed within the interior cavity. In an operation 810, responsive to a determination that there is no leak, process 800 may include closing the path to the valve body by rotating the cover about the cover mounting fastener. In an operation 812, process 800 may include removing the vacuum relief valve for repair based on the determination that there is a leak because bubbles formed within the interior cavity. After each attempt to repair the valve, at least operations 806 and 808 may be repeated until no bubbles form indicating that there are no leaks in the valve.

It is to be understood that the invention is not limited in its application to the details of construction and the arrangement of the components set forth herein. The invention is capable of other embodiments and of being practiced or being carried out in various ways. Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

While the preferred embodiments of the invention have been shown and described, it will be apparent to those skilled in the art that changes and modifications may be made therein without departing from the spirit of the invention, the scope of which is defined by this description.

Reference in this specification to "one implementation", "an implementation", "some implementations", "various implementations", "certain implementations", "other implementations", "one series of implementations", or the like means that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is express reference to an "implementation" or the like, various features are described, which may be variously combined and included in some implementations, but also variously omitted in other implementations. Similarly, various features are described that may be preferences or requirements for some implementations, but not other implementations.

The language used herein has been principally selected for readability and instructional purposes, and it may not have been selected to delineate or circumscribe the inventive subject matter. Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method for inspecting a vacuum relief valve mounted to a railroad tank car for leaks, the method comprising:
    installing a vacuum relief valve on a railroad tank car;
    injecting a leak detection fluid into an interior cavity of a body of the vacuum relief valve; and
    determining whether there is a leak at the vacuum relief valve without removing the vacuum relief valve from the railroad tank car based on whether one or more bubbles appear at or within an opening of the body of the vacuum relief valve, wherein no bubbles forming at or within an opening of the body of the vacuum relief valve indicates that there is no leak.

2. The method of claim 1, wherein injecting the leak detection fluid into the interior cavity of the body of the vacuum relief valve comprises:
    sealing all but one of two or more access openings located on the body of the vacuum relief valve; and
    injecting the leak detection fluid into the interior cavity of the body of the vacuum relief valve via the one unsealed access openings located on the body of the vacuum relief valve.

3. The method of claim 2, the method further comprising:
    unsealing the all but one of the two or more access openings located on the body of the vacuum relief valve based on a determination that there is no leak because no bubbles formed at any of the access openings.

4. The method of claim 2, wherein the two or more access openings extend radially and outwardly from an interior cavity of the vacuum relief valve.

5. The method of claim 2, wherein the two or more access openings are integral to the body of the vacuum relief valve.

6. The method of claim 2, wherein the two or more access openings include four access openings equally spaced apart from one another circumferentially on an outer surface of the body of the vacuum relief valve.

7. The method of claim 1, wherein injecting the leak detection fluid into the interior cavity of the body of the vacuum relief valve comprises:
    sliding a cover selectively attached to a top surface of the vacuum relief valve to an open position to reveal an opening to the interior cavity of the vacuum relief valve; and
    injecting the leak detection fluid into the interior cavity of the body of the vacuum relief valve via the opening to the interior cavity of vacuum relief valve revealed by sliding the cover to the open position.

8. The method of claim 7, the method further comprising:
    sliding the cover to a closed position to block access to the interior cavity of the vacuum relief valve based on a determination that there is no leak because no bubbles formed within the interior cavity.

9. The method of claim 7, wherein the cover is selectively attached to the body of the vacuum relief valve via two or more cover mounting fasteners, and wherein the cover is configured to slidably rotate about one of the two or more cover mounting fasteners when all but the one of the two or more cover mounting fasteners are removed.

10. The method of claim 9, wherein the cover is secured to the body of the vacuum relief valve using a safety cable extending between at least two of the two or more cover mounting fasteners.

11. The method of claim 1, the method further comprising:
   removing the vacuum relief valve for repair based on a determination that there is a leak because bubbles formed at or within an opening of the body of the vacuum relief valve.

12. The method of claim 1, wherein the vacuum relief valve further includes an air-filter screen to prevent debris from reaching the vacuum relief valve and a screen cover to protect the air-filter screen.

13. The method of claim 11, wherein the screen cover includes one or more screen access openings.

14. The method of claim 11, wherein the screen cover includes a mesh selected to limit a size of debris particles that can enter into the vacuum relief valve.

15. The method of claim 11, wherein the screen cover is configured to form a debris tight seal when in contact with the body of the vacuum relief valve.

\* \* \* \* \*